United States Patent [19]
Michaelis

[11] 3,953,199
[45] Apr. 27, 1976

[54] PROCESS FOR REFINING PIG IRON
[75] Inventor: Eduard M. Michaelis, Seewalchen, Austria
[73] Assignee: Vereinigte Osterreichische Eisenund Stahlwerke, Vienna, Austria
[22] Filed: Feb. 11, 1974
[21] Appl. No.: 441,391

[30] Foreign Application Priority Data
Feb. 12, 1973   Austria .............................. 1256/73

[52] U.S. Cl. ........................................ 75/60; 75/59
[51] Int. Cl.² ........................ C21C 5/32; C21C 5/34
[58] Field of Search ................................. 75/60, 59

[56] References Cited
UNITED STATES PATENTS

| | | | |
|---|---|---|---|
| 2,962,277 | 11/1960 | Morrill | 75/60 |
| 3,046,107 | 7/1962 | Nelson | 75/60 |
| 3,706,549 | 12/1972 | Knuppel | 75/60 |
| 3,807,989 | 4/1974 | Nilles | 75/60 |
| 3,854,932 | 12/1974 | Bishop | 75/60 |

Primary Examiner—Peter D. Rosenberg
Attorney, Agent, or Firm—Cushman, Darby & Cushman

[57] ABSTRACT

Process for refining pig iron with technically pure oxygen within a converter or similar receptacle wherein the oxygen is supplied to the iron bath simultaneously from above and as well as from below, characterized in that oxygen is supplied to the bath from above by blowing onto the bath surface and in that the oxygen supplied to the bath from below is supplied by an oxygen jet in the proximity thereof hydrocarbons, particularly hydrocarbons of higher molecular weight, are introduced into the bath in a gaseous or liquid condition.

4 Claims, 1 Drawing Figure

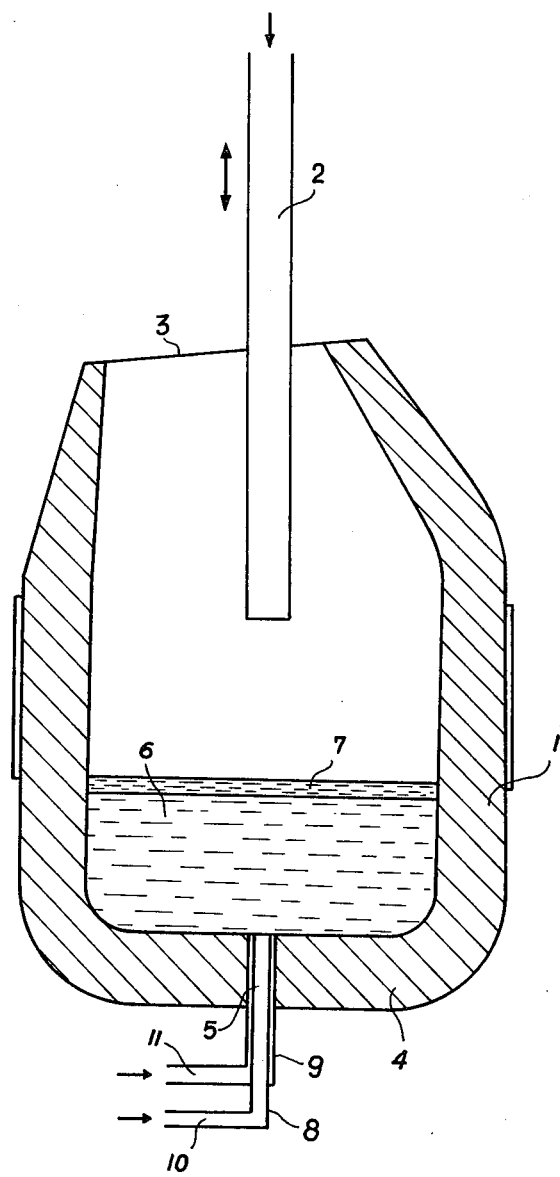

PROCESS FOR REFINING PIG IRON

The invention refers to a process for refining pig iron with technically pure oxygen within a converter or similar receptacle, wherein the oxygen is supplied to the iron bath simultaneously from above and from below. The invention further refers to an apparatus for performing this process.

It is known that the process for blowing oxygen onto the surface of an iron bath and having become known as the so-called LD-process permitted for the first time the use of technically pure oxygen for refining pig iron and permitted high additions of scrap. Therefore, this process soon encountered wide-spread use.

When blowing oxygen onto the surface of the iron bath the oxygen impinging the bath surface will vigorously react with the carbon present within the bath, which results in a deep-reaching bath agitation. In view of this bath agitation still new portions of the bath are brought up to the surface thereof, thus maintaining the refining reaction. With the carbon content of the bath becoming reduced to 0.2 to 0.05 percent by weight the reaction of the oxygen with the reduced amount of carbon will become weaker, which will be the case also with the bath agitation. The composition of the bath at different height levels will also become less uniform and the reaction will slow down so that optimum rate of decarburization can no more be maintained. When producing soft steels, this will result in longer refining periods and in a relatively high content in iron oxides within the slag. A further disadvantage of this process has been seen in the reddish brown fumes produced which required dust separation from the waste gases.

For these reasons many proposals have been made to avoid the mentioned drawbacks of the process mentioned. A known process (US-PS 3,030,203) resides in interrupting oxygen supply onto the bath surface when attaining a carbon content between from 0.20 to 0.05 percent by weight, in then tilting the converter into approximately a horizontal position and then to complete refining of the melt by means of an oxygen lance introduced into the melt in an inclined position. This process was not in practical use, obviously in view of the fact that when refining the melt by means of a submerged lance within a tilted converter the bath surface is of considerable extent and the resulting reaction will still be confined to a locally limited area having as a consequence prolonged refining periods.

For avoiding the reddish brown fumes there has been proposed (GB-PS 882,676) to blow the oxygen into the bath from above by means of a consumable coaxial tube lance, noting that the oxygen is supplied via the inner tube whereas an other combustible gas, f.i. hydrocarbons, is blown into the bath via the annular space between the inner tube and the outer tube, so that any mixing of the gases may take place only outside of the lance mouth. The proportions of the gases are selected such that there is an excess of oxygen. This measure shall suppress the formation of the reddish brown fumes without exerting any excessive cooling action on the bath. Also this proposal was not used in practice because formation of reddish brown fumes can only partially be reduced so that the waste gases have still to be subjected to a dust removal step. This proposal however perhaps gave rise to the further proposal (FR-PS 1,450,718) to supply the oxygen according to the mentioned manner by means of a coaxial tube through the converter bottom, i.e. from below, into the melt, noting that also in this case the oxygen is supplied via the inner tube and hydrocarbon is supplied via the annular space between the inner tube and the outer tube as an additional gas or sheathing gas. Also these measures did not result in a complete suppression of the formation of the reddish brown fumes within the waste gases but resulted in a good turbulence of the bath and, for the first time, in an acceptable service life of the converter bottom and of the nozzles for supplying pure oxygen and additional gas, so that this proposal has already been used in practice. This process shows essential drawbacks consisting in that the bath will become enriched in hydrogen as soon as the carbon content of the bath becomes low and the formation of carbon monoxide becomes reduced and that this hydrogen has to be removed by additional operation steps, in that also the waste gases have a high content in hydrogen which is disturbing in the dust removal step, and in that the slag floating on the bath is relatively cold and will easily solidify so that a high amount of ejections is to be taken into account. Ejections of material can only be avoided by introducing lime together with a stream of oxygen which will result in a high expenditure in view of the increased number of nozzles required.

For ensuring the required turbulence of the bath and for suppressing the reddish brown fumes it has also been proposed (US-PS 3,259,484) to supply oxygen to the bath simultaneously from above and from below, noting that the major portion of the oxygen required for refining action is to be supplied through the pores of a porous converter bottom. By strongly subdividing the oxygen stream it is intended to avoid local superheating so that formation of reddish brown fumes will be suppressed and a good service life of the converter bottom will be guaranteed. The oxygen supplied into the bath from above shall be loaded, according to this proposal, with lime required for the slag formation and be supplied by means of a lance submerged into the bath. By cooling the area of reaction with lime and by positioning the area of reaction at a location below the bath surface, the formation of reddish brown fumes shall also be avoided. This proposal has not found practical use, obviously mainly because no acceptable service life of the converter bottom could be attained and the formation of reddish brown fumes could, as is the case with all refining processes operated with pure oxygen, not be suppressed to such an extent that subsequent dust removal from the waste gases could be avoided.

It is an object of the invention to avoid the mentioned drawbacks as far as they can be avoided. In processes as described in the beginning and in processes as last mentioned, this is achieved by supplying the oxygen to the bath from above by impingement from above and by supplying the oxygen to the bath from below by means of a jet adjacent of which are introduced into the bath hydrocarbons, particularly hydrocarbons of higher molecular weight, in a gaseous or liquid condition. The invention accordingly consists in a combination of two features known per se and, respectively, processes known per se, both of which have been used in practice but have up till now, been considered as competing processes. Preferably the oxygen jet supplied from below is, in a manner known per se, sheathed by a sheath of gaseous hydrocarbon by using a sheathing tube (coaxial tubes).

By the invention, dust removal from the waste gases does not become superfluous but notwithstanding many advantages result as compared with the known processes. Compared with processes simply supplying oxygen from above, the refining periods are shortened, the amount of added scrap or ore can be increased and in view of the increased turbulence the content of the slag in iron oxides is reduced when producing low carbon steels. As compared with the processes simply operated with sheathing tubes (coaxial tubes) supplying the gases from below through the bottom of the converter, the formation of the slag is improved by the hot bath surface and a more simple possibility for loading the oxygen with lime, this because the oxygen itself can be loaded with lime, is provided. In connection therewith the converter ejections are reduced and the yield is increased. Furthermore, the waste gas has a lower content in hydrogen and the danger of an increased content in hydrogen of the steel produced is not present because, in principle, less gaseous hydrocarbons are required and the hydrogen absorbed from the bottom nozzles is washed out by the pure carbon monoxide produced on refining the bath by supplying oxygen from above. Furthermore, the expenditure for the oxygen lance is approximately compensated by the reduced number of required bottom nozzles, the required fittings included. With smaller converters one can even do with one single bottom nozzle. In view of the refining being effected for the major part from above the bath and thus requiring less bottom nozzles and, respectively, a shorter time for fully operating the bottom nozzles, and, respectively, a reduced gas supply to the nozzles, it is further possible to easily match the service life of the converter bottom to the service life of the other converter lining without the necessity to make the converter bottom excessively thick. Therefore, according to a further feature of the invention, it is proposed to select the pressure of the oxygen supplied from below at the beginning of the refining process so that the pig iron is only prevented from entering into the nozzles, and to increase the pressure only during processing.

The invention further refers to an apparatus for performing the process according to the invention and consisting of a converter and an oxygen lance for blowing oxygen from above and adapted to be lowered from above through the converter mouth, noting that the converter bottom comprises one or more sheathing gas nozzles (coaxial tubes) for supplying oxygen at the one hand and gaseous hydrocarbons as sheathing gas on the other hand.

An embodiment of the invention will be described with reference to the drawing.

The drawing is illustrating an apparatus according to the invention. The receptacle, a converter 1, is provided with an oxygen lance 2 for supplying oxygen from above and arranged for being lowered through the converter mouth 3. The converter bottom 4 comprises a bottom nozzle 5, consisting of two concentric tubes 8 and 9 fitted one into the other. The inner tube 8 is for supplying oxygen, whereas a gaseous hydrocarbon, f.i. natural gas, is supplied via the annular space between inner tube 8 and outer tube 9. With greater converters a plurality of bottom nozzles 5 are provided. The process is preferably as follows: First, the converter 1 is tilted for a small angle and charged with scrap. Subsequently, nitrogen is introduced into the converter via both supply conduits 10, 11 and pig iron 6 is charged into the converter, whereupon the converter is again put in upright position. The oxygen lance 2 is then lowered through the converter mouth 3 and oxygen loaded with lime dust is blown onto the pig iron. Subsequently, by switching over valves (not shown) provided in the supply conduits 10, 11 leading to nozzle tubes 8 and 9 oxygen is supplied into nozzle tube 8 and natural gas is supplied into nozzle tube 9. The pressure of both gases is first adjusted so that the pig iron is reliably prevented from entering the nozzles. In view of the high temperature of the bath surface a slag layer 7 is formed from the lime dust, and the pig iron is being rapidly refined. As soon as the refining action becomes reduced, the pressure of the oxygen within the supply conduit 11 leading to the tube 8 of the bottom nozzle 5 is increased and the pressure within the supply conduit leading to oxygen lance 2 is somewhat reduced so that the proportion of the refining action exerted by the oxygen supplied via the bottom nozzle 5 is increased and will attain about 50 percent of the total refining action. As soon as the desired carbon content has been reached, the bottom nozzle 5 is again supplied with nitrogen and the oxygen lance 2 is lifted and thereby stopping oxygen supply to said lance 2. Subsequently the refined melt may be tapped into a pouring vessel together with required additions.

It is obvious to the man skilled in the art that modifications and variations of the embodiment are possible, if required. The slag may be tapped off during refining and provision can be made for temporarily supplying to the bottom nozzle 5 other gases, f.i. argon, for degassing purposes or other metallurgical effects.

The hydrocarbons used as a sheathing gas may be those as derived from petroleum, particularly those having in their molecules up to 20 carbon atoms; natural gas is the most preferred hydrocarbon because of its ease of availability, fuel oil may, however, also be used because it will be cracked under the influence of the high process temperature to a gas containing components of low molecular weight.

What I claim is:

1. In a process for refining pig iron with technically pure oxygen within a converter wherein the oxygen is supplied to the bath simultaneously from above and from below the surface of the melt by impingement onto the bath surface by means of a lance and by means of at least one bottom nozzle below the surface of the bath, said nozzle providing an oxygen jet, said nozzle also providing hydrocarbons as a sheathing for said oxygen jet, the improvement comprising undertaking said refining by impinging oxygen onto the surface of the bath while adjusting the pressure of the oxygen supplied from below at the beginning of the refining process so that the pressure is adequate to prevent said pig iron from entering said nozzle; continuing said refining by impinging until the amount of carbon in the bath contents is between 0.2 and 0.05 percent by weight; and increasing the pressure of oxygen introduced from below when the amount of carbon in the bath content is between 0.2 and 0.05 percent by weight, thereby enhancing the turbulence and stirring action and the rate of refining action which decrease when the amount of carbon in the bath content falls to between 0.2 and 0.05 percent by weight.

2. A process as in claim 1 further comprising introducing nitrogen through the bottom nozzle during the charging of said converter.

3. A process as in claim 1 further comprising reducing the oxygen supply to the lance as soon as the refining action slows down.

4. A process as in claim 1 further comprising introducing nitrogen through the bottom nozzle during the charging of the converter.

\* \* \* \* \*